(12) United States Patent
Hubert et al.

(10) Patent No.: US 10,920,550 B2
(45) Date of Patent: *Feb. 16, 2021

(54) MICROBIALLY ENHANCED THERMAL OIL RECOVERY

(71) Applicant: 9668241 CANADA INC, Ottowa (CA)

(72) Inventors: Casey Hubert, Calgary (CA); Milovan Fustic, Calgary (CA)

(73) Assignee: 9668241 Canada Inc., Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/885,228

(22) Filed: May 27, 2020

(65) Prior Publication Data
US 2020/0355053 A1 Nov. 12, 2020

Related U.S. Application Data

(63) Continuation of application No. 16/582,787, filed on Sep. 25, 2019, now Pat. No. 10,704,372, which is a
(Continued)

(51) Int. Cl.
*E21B 43/24* (2006.01)
*C09K 8/592* (2006.01)
(Continued)

(52) U.S. Cl.
CPC ......... *E21B 43/2408* (2013.01); *C09K 8/582* (2013.01); *C09K 8/592* (2013.01); *E21B 43/26* (2013.01)

(58) Field of Classification Search
CPC ................... E21B 43/2408; C09K 8/582
(Continued)

(56) References Cited

U.S. PATENT DOCUMENTS 4,446,919 A 5/1984 Hitzman
4,694,907 A 9/1987 Stahl et al.
(Continued)

FOREIGN PATENT DOCUMENTS

CA 2863617 A1 8/2013
CN 101240704 A 8/2008
(Continued)

OTHER PUBLICATIONS

Hubert et al. Environmental Microbiology 12(4): 1089-1104 (2010). 16 pages.
(Continued)

*Primary Examiner* — Zakiya W Bates
*Assistant Examiner* — Ashish K Varma
(74) *Attorney, Agent, or Firm* — Hahn Loeser & Parks, LLP

(57) ABSTRACT

A method and a system for recovering oil from currently inaccessible oil containing geological units by activating the deep biosphere microbial seed bank. Nutrient and thermal enhancement of microorganisms in oil containing geological units allows for stimulation of inactive and/or dormant microorganisms such that they proliferate and produce gas. The oil viscosity that is decreased by heat, along with the gas pressure produced by activated microbes which allows previously inaccessible oil to flow toward production wells.

19 Claims, 16 Drawing Sheets

Related U.S. Application Data continuation of application No. 15/762,557, filed on Mar. 22, 2018, now Pat. No. 10,544,664, which is a continuation-in-part of application No. PCT/CA2016/051114, filed on Sep. 22, 2016.

(60) Provisional application No. 62/221,936, filed on Sep. 22, 2015.

(51) Int. Cl.
 *C09K 8/582* (2006.01)
 *E21B 43/26* (2006.01)

(58) Field of Classification Search
 USPC .......................................................... 166/246
 See application file for complete search history.

(56) References Cited

U.S. PATENT DOCUMENTS

| | | | |
|---|---|---|---|
| 5,492,828 | A | 2/1996 | Premuzic et al. |
| 8,746,334 | B2 | 6/2014 | Coskuner |
| 8,863,855 | B2 | 10/2014 | Kotlar |
| 8,895,479 | B2 | 11/2014 | Roldan Carrillo et al. |
| 9,868,895 | B2 | 1/2018 | Sheehy et al. |
| 2009/0029879 | A1 | 1/2009 | Soni et al. |
| 2009/0288843 | A1 | 11/2009 | Gray |
| 2010/0012331 | A1 | 1/2010 | Larter et al. |
| 2012/0261117 | A1 | 10/2012 | Pavia et al. |
| 2013/0153216 | A1 | 6/2013 | Scott |
| 2014/0116682 | A1* | 5/2014 | Bracho Dominguez ............ E21B 43/2408 166/246 |
| 2014/0190689 | A1 | 7/2014 | Warren et al. |
| 2015/0053407 | A1 | 2/2015 | Voordouw et al. |
| 2017/0051595 | A1 | 2/2017 | Marcotte et al. |
| 2017/0089186 | A1 | 3/2017 | Sheehy et al. |

FOREIGN PATENT DOCUMENTS

| | | |
|---|---|---|
| CN | 101842459 A | 9/2010 |
| CN | 102504789 B | 9/2013 |
| WO | 2016168937 A1 | 10/2016 |
| WO | 2017049404 A1 | 3/2017 |

OTHER PUBLICATIONS

ISA/CA, International Search Report and Written Opinion for corresponding PCT International Patent Application No. PCT/CA2016/051114 dated Dec. 5, 2016. 7 pages.
Office Action issued on corresponding Chinese Patent Application No. 201680065439.X dated Sep. 4, 2019. 6 pages.
Office Action issued on corresponding Eurasian Patent Application No. 201890544 dated Jun. 28, 2019. 3 pages.
EP Communication issued on corresponding European Patent Application No. 16847691.9 dated May 7, 2018. 3 pages.
EP Communication issued on corresponding European Patent Application No. 16847691.9 dated Apr. 11, 2019.
ISA/CA, International Search Report and Written Opinion for corresponding PCT International Patent Application No. PCT/CA2019/050358 dated Jun. 13, 2019. 8 pages.
Office Action issued on corresponding Chinese Patent Application No. 201680065439.X dated May 7, 2020. 5 pages.
Office Action issued on corresponding Colombian Patent Application No. NC2018/0003510 dated Jan. 22, 2020. 7 pages.
Office Action issued on corresponding Eurasian Patent Application No. 201890544 dated Dec. 30, 2019. 3 pages.
EP Communication issued on corresponding European Patent Application No. 16847691.9 dated Nov. 12, 2019. 7 Pages.
Office Action issued on corresponding Indian Patent Application No. 201817010160 dated May 21, 2020. 8 pages.

* cited by examiner

MICROBIALLY ENHANCED THERMAL OIL RECOVERY

RELATED APPLICATIONS

This application is a continuation of U.S. application Ser. No. 16/582,787, filed Sep. 25, 2019, which is a continuation of U.S. application Ser. No. 15/762,557, filed Mar. 22, 2018, which is a continuation-in-part application of PCT International Application No. PCT/CA2016/051114, filed Sep. 22, 2016, which claims the benefit of U.S. Provisional Patent Application No. 62/221,936, filed Sep. 22, 2015, the disclosures of which are explicitly incorporated by reference herein in their entirety.

TECHNICAL FIELD

The present invention relates to the field of oil production from subsurface oil deposits.

BACKGROUND

Oil reservoirs are geological units within the subsurface of the Earth that contain an accumulation of oil. The oil from the reservoirs is extracted or recovered for use by a process commonly referred to as oil production. Conventional oil production typically involves two stages: primary recovery and secondary recovery. Primary recovery involves the use of natural in-reservoir high pressure forces to drive the flow of oil to oil production wells. Secondary recovery typically involves the maintenance of this high pressure by pumping fluids into the reservoir so that oil production may continue.

In oil reservoirs that contain heavy oil or oil-sands (also known as tar sands, bitumen, or bituminous sands), the oil is too viscous to flow freely to the production wells by conventional methods. As such, other means of oil production, such as thermal recovery strategies, must be employed. Thermal recovery strategies involve heating the oil reservoirs to improve the mobility of the oil and thus the ease of its subsequent extraction. The applied heat reduces the oil's viscosity allowing it to flow to production wells. An example of a commonly used thermal recovery strategy in heavy oil recovery is the Steam-Assisted Gravity Drainage (SAGD) method.

The SAGD method involves the use of steam injection well 5 and production well 7 pairs, as depicted in FIGS. 1, 2 and 3 of the prior art. The steam injection well introduces steam into a clean sand area 8 of an oil reservoir. The injected steam migrates upwards until reaching geological units that prevent further migration of the steam. The injected steam heats the reservoir to temperatures of approximately 200° C., reducing the viscosity of the oil and allowing it to flow to the oil production wells. This is referred to as the steam chamber 10, shown in FIGS. 2 AND 3. The steam is constantly injected to decrease oil viscosity, facilitating the continuous flow of oil towards the production wells, and to help displace the oil from the sand.

There are several drawbacks to the SAGD process. One major issue is that the SAGD steam-generation process has a negative environmental impact. For example, the SAGD process is a large contributor of greenhouse gas emissions. This is because large amounts of natural gas must be combusted to provide the energy to heat water to create the steam. Not only does burning natural gas contribute significantly to greenhouse gas emissions, it also represents an added cost for bitumen production. Furthermore, the SAGD process also consumes large amounts of water resources for the creation of the steam.

As the production of steam is the primary contributor to the environmental and economic impact of the SAGD method, the environmental efficiency of SAGD operations may be expressed in terms of the steam-to-oil ratio (Gates & Larter, 2014, incorporated herein by reference). The steam-to-oil ratio encompasses both the environmental and economic cost of steam generation in relation to the amount of crude oil resource that is recovered. A lower steam-to-oil ratio means fewer greenhouse gas emissions and improved environmental performance per unit of production.

The energy costs and greenhouse gas emissions associated with unconventional oil sands extraction and production, such as SAGD operations, are approximately 100-200% greater than for conventional oil production ("The Truth About Dirty Oil: Is CCS the Answer?", Bergerson & Keith, Environmental Science & Technology, 2010, 44, 6010-6015, incorporated herein by reference). As such, new strategies and technologies for improving the environmental and economic performance in oil sands extraction must be developed to lower the steam-to-oil ratio associated with SAGD operations.

Production from conventional oil reservoirs is typically inefficient at extracting all of the available oil from the targeted region. As such, there are many strategies that aim to increase oil recovery. Some of these strategies include the use of microorganisms in the subsurface.

Subsurface environments are microbial habitats and include a wide variety of microbial taxa. FIG. 4 of the prior art shows a histogram of the abundance rank order of different microbial taxa in a subsurface environmental sample; adapted from Pedrós-Alió (2006) "Marine microbial diversity, can it be determined?", Trends in Microbiology, Vol 14, No 6, pp 257-263. The bars of the histogram are indistinguishable as they are very close together. The lighter shaded area 1 on the left of the histogram represents abundant taxa, and the darker shaded area 2 to the right represents the rare taxa. Therefore, in a given environmental sample, there is often a large proportion of abundant and active microorganisms along with a variety of low abundance, inactive and/or dormant microorganisms. For example, in some microbial communities, one species might encompass up to 20% of the total cells present, whereas hundreds of rare species may collectively make up less than 1% of the total.

Microbially Enhanced Oil Recovery (MEOR) is a term to describe strategies for conventional oil production that target the use of microbial communities for enhancing and increasing oil recovery from conventional oil reservoirs. MEOR is typically employed after primary and secondary recovery. With MEOR, microbes are utilized in the conventional target regions of the reservoir to improve oil production. MEOR is believed to occur by a variety of mechanisms related to microbial metabolism in oil reservoirs, including biosurfactant production, metabolism of oil, and production of gas as a metabolic by-product. Each of the processes mentioned above helps to increase the fluid mobility of the oil, leading to the production of the residual oil still present in the reservoir after primary and secondary recovery strategies.

MEOR is typically attempted as a tertiary recovery strategy in conventional oil reservoirs. However, due to the unconventional nature of heavy oil and oil sands and the unconventional production methods for producing this oil, MEOR strategies are not frequently applied in heavy oil and oil sands.

MEOR may be applied to the commonly-targeted region of a heavy oil or oil sands unit before or after the application of strategies such as the SAGD method. MEOR involves either (1) biostimulation, i.e., the injection of nutrients to stimulate the native predominant and abundant taxa, or (2) bioaugmentation, i.e., the injection of foreign bacteria that are thought to be suitable for the reservoir conditions.

The high temperature of the SAGD steam chamber sterilizes the conventional target region of the oil sands reservoir. Therefore, when MEOR is utilized for enhancing oil recovery from the SAGD steam chamber of a heavy oil sands reservoir, MEOR may only be applied either before the steam is injected into the reservoir, or after the SAGD method is complete and the reservoir has cooled down to low temperatures. U.S. patent application Ser. No. 14/070,095, incorporated herein by reference, describes a method of injecting foreign bacteria prior to injecting steam as a part of SAGD for increasing the fluid mobility of oil in a heavy oil reservoir. In this method, microorganisms are introduced into the reservoir through both injection and production wells, prior to steam injection, to pre-condition the reservoir for enhanced (shorter) start-up of the SAGD process.

U.S. Pat. No. 4,475,590, incorporated herein by reference, provides an example of biostimulation in a conventional oil reservoir in conjunction with waterflood technology. Waterflooding aims at displacing the residual oil in the reservoir with water, rather than the steam that is applied during the SAGD method. Similarly, U.S. Pat. Nos. 4,971,151, and 5,083,611, incorporated herein by reference, describe methods involving the injection of nutrients in the conventional oil reservoirs for enhancing oil recovery.

All of these methods, however, focus on the active taxa present in high relative abundance in the microbial communities that are adapted to local prevailing in situ conditions (temperature, geochemistry, salinity, mineralogy, etc.) and that are readily investigated by microbiological methods. Yet, in nearly every environment there are microbial seed banks that include many species or taxa of microorganisms present in low relative abundance. These microbial taxa can be inactive or dormant, and may include dormant bacterial endospores. Microbial seed banks may constitute significantly less than 0.01% of the total cells present, and often exist in a dormant state. As such, they are typically not detected or highlighted by most environmental DNA extraction surveys, and other more traditional methods for microbial characterization of oil reservoir environments.

Furthermore, the subsurface regions beyond the boundaries of the SAGD steam chamber, such as inclined heterolithic strata (IHS), may contain up to twice as much oil sands resource as the targeted steam chamber region. However, production of the oil in the IHS region during SAGD is limited. This IHS oil is interbedded with thin, but laterally extensive, low-permeability mudstone layers through which the steam cannot penetrate. Therefore, methods other than gravity drainage are required to displace the oil. The oil in the IHS is considered higher quality and more valuable than the oil in the steam chamber region as it is less biodegraded and less viscous ("Impact of oil-water contacts, reservoir (dis)continuity, and reservoir characteristics on spatial distribution of water, gas, and high-water" Fustic et al., 2013, Heavy Oil/Bitumen Petroleum Systems in Alberta & Beyond, Eds. F. J. Hein, J. Sutter, D. A. Leckie, and S. Larter, AAPG Memoir, p. 163-205, incorporated herein by reference in its entirety).

FIG. 5 shows a schematic of an example of a commonly-targeted geological unit in the subsurface of the Athabasca oil sands. The lower region represents the target for steam chamber 10 placement, which is the targeted region for SAGD. The upper region represents the IHS region 20, which contains oil that is not easily accessible by current methods. Limited oil recovery is documented from the IHS. The diagonal lines in the IHS region represent the laterally extensive mud strata 30 interbedded with decimeter scale heavy oil or bitumen saturated laterally extensive porous sands. Above and below these regions are the low-permeability non-reservoir underseal 22 and seal 25.

FIG. 6 shows a photograph of an Athabasca Oil Sands outcrop near Fort McMurray in Alberta, Canada by Strobl et al. (1997) from the *Canadian Society of Petroleum Geologists*, Memoir 18, pp 375-391. The geological unit shown in FIG. 5 is representative of the geological unit in the Athabasca Oil Sands. Referring back to FIG. 6, the white substantially parallel lines along the upper half of the geological unit represent the laterally extensive mud strata 30 of the IHS region 20, and have a slope of approximately six (6) to ten (10) degrees. The lowest laterally extensive mudstone layer 35, as denoted by the arrow, defines the expected upper boundary of the SAGD steam chamber 10 (as demonstrated by subsurface studies, Strobl et al., 1997, Strobl, 2013).

While means to increase oil recovery from the accessible regions, such as the SAGD steam chamber, are widely researched, access to the oil in the IHS layer remains challenging with use of existing technologies. There are many initiatives to try to access this oil, such as by attempting to break the mudstone in the IHS by geomechanical, electrical, Enhanced Solvent Extraction Incorporating Electromagnetic Heating (ESEIEH), or thermo-chemical processes to access the oil. However, these approaches have had a very limited success thus far.

There is therefore a need to mitigate, if not overcome, the shortcomings of the prior art and to, preferably, develop a method to produce oil or increase oil production from currently challenging IHS regions of oil reservoirs.

SUMMARY

The present invention provides a method and a system for recovering oil from currently inaccessible oil containing geological units by activating the deep biosphere microbial seed bank. Nutrient and thermal enhancement of microorganisms in oil containing geological units allows for stimulation of inactive and/or dormant microorganisms such that they proliferate and produce gas. The oil viscosity that is decreased by heat, along with the gas pressure produced by activated microbes, enables production of previously inaccessible oil via flow toward production wells.

It is an aim of the present invention to utilize the conductive heat generated by SAGD, combined with nutrient injection, to enable the production of oil trapped in geological strata such as the IHS. When used in conjunction with SAGD technology, the present invention may be referred to as a Microbially influenced SAGD (MiSAGD) method or system.

It is another aim of the present invention to access oil reservoirs that are not accessible by either conventional oil production methods or SAGD. These sediment layers may be thermally treated with warm water (for example, up to 70° C. or higher, or warm water that is warmer than the subsurface temperature) to reduce viscosity, as well as by added nutrients for microbial enhancement (e.g. of dormant thermophiles), to facilitate the production of oil. In such circumstances, the present invention may be referred to as a Microbially Enhanced Thermal Oil Recovery (METeOR) method or system.

In a first aspect, the present invention provides a method for oil recovery from a subsurface oil reservoir, the method comprising steps of: (a) utilizing at least one injection well within the subsurface; (b) utilizing a heat source to heat the subsurface; (c) injecting at least one nutrient into the subsurface through the at least one injection well; (d) stimulating activity of at least one gas-producing microorganism located in the subsurface to produce a gas pressure; and (e) recovering oil through a production recovery well.

In a second aspect the present invention provides a method for oil recovery in a subsurface oil reservoir, the method comprising steps of: (a) utilizing at least one injection well within the subsurface; (b) utilizing a change in temperature of the subsurface; (c) injecting at least one gas-producing microorganism in to the subsurface through the at least one injection well; (d) injecting at least one nutrient into the subsurface through the at least one injection well; (e) stimulating activity of the at least one gas-producing microorganism and (f) recovering oil through a production recovery well.

In a third aspect, the present invention provides a method for oil recovery in a subsurface oil reservoir, the method comprising steps of: (a) utilizing at least one injection well within the subsurface; (b) utilizing a change in temperature of the subsurface; (c) injecting at least one nutrient into the subsurface through the at least one injection well; (d) stimulating activity of at least one gas-producing microorganism; and (d) recovering oil through a production recovery well.

BRIEF DESCRIPTION OF THE DRAWINGS

The embodiments of the present invention will now be described by reference to the following figures, in which identical reference numerals in different figures indicate identical elements and in which.

The figures are not to scale and some features may be exaggerated or minimized to show details of particular elements while related elements may have been eliminated to prevent obscuring novel aspects. Therefore, specific structural and functional details disclosed herein are not to be interpreted as limiting but merely as a basis for the claims and as a representative basis for teaching one skilled in the art to variously employ the present invention.

DETAILED DESCRIPTION

This document refers to oil as a generic term. However, the term oil may be used interchangeably with the terms heavy oil, extra-heavy oil, natural bitumen, tar-sands, oil-sands, bituminous sands or petroleum. The present invention provides a method to recover oil from inaccessible oil-containing geological units by activating the existing microbial seed bank present in situ. By utilizing nutrients and heat, dormant or low abundance microorganisms, including bacterial endospores, that are situated in oil containing geological units, may be stimulated to proliferate and produce gas for enhanced oil recovery via enhanced pressurization. The supplied heat that further lowers the viscosity of the oil, along with the gas pressure produced by the activated microbial communities that were formerly inactive or dormant, combine to allow the previously inaccessible oil to flow toward an oil production well.

Figure 7:
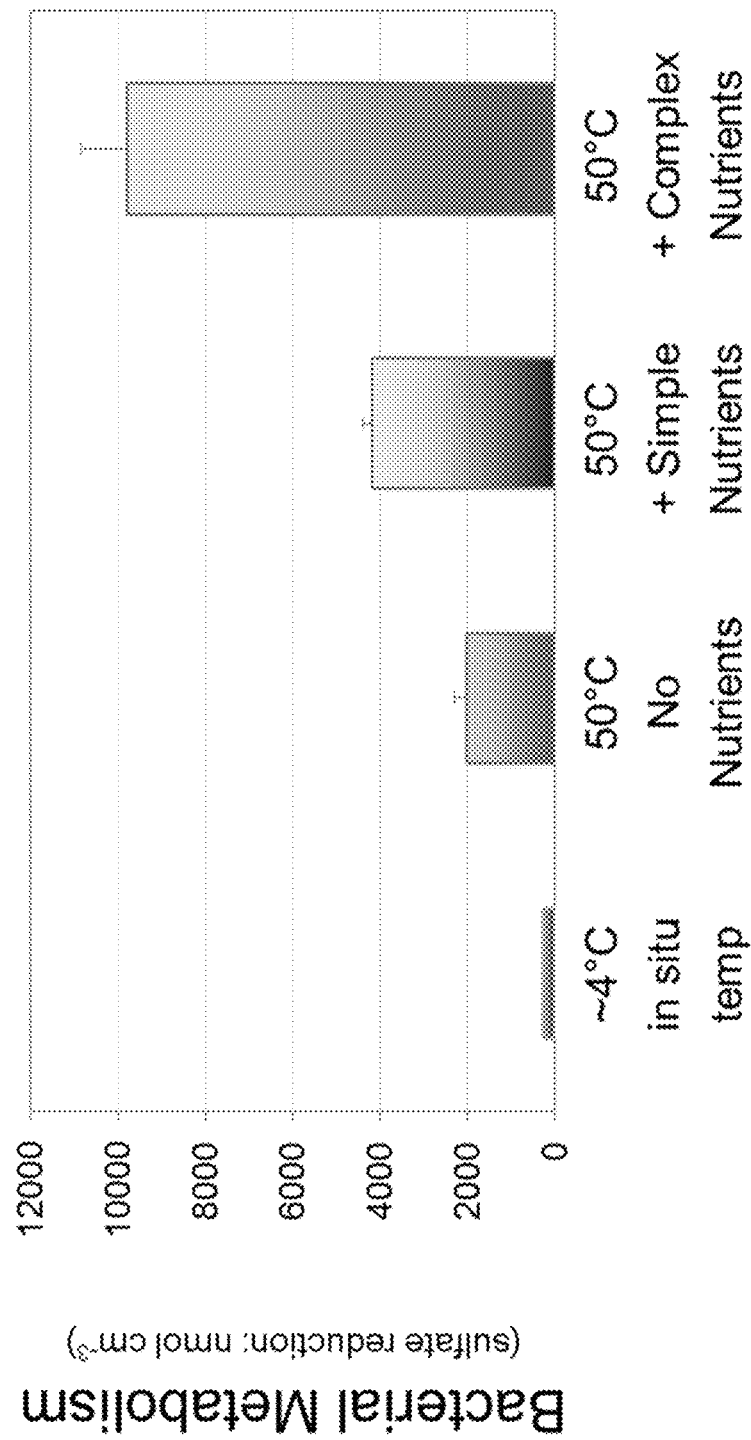
FIG. 7 shows a bar graph representing bacterial metabolism for sediment samples from the Arctic Ocean seabed under various nutrient and temperature conditions of the prior art.
Figure 8:
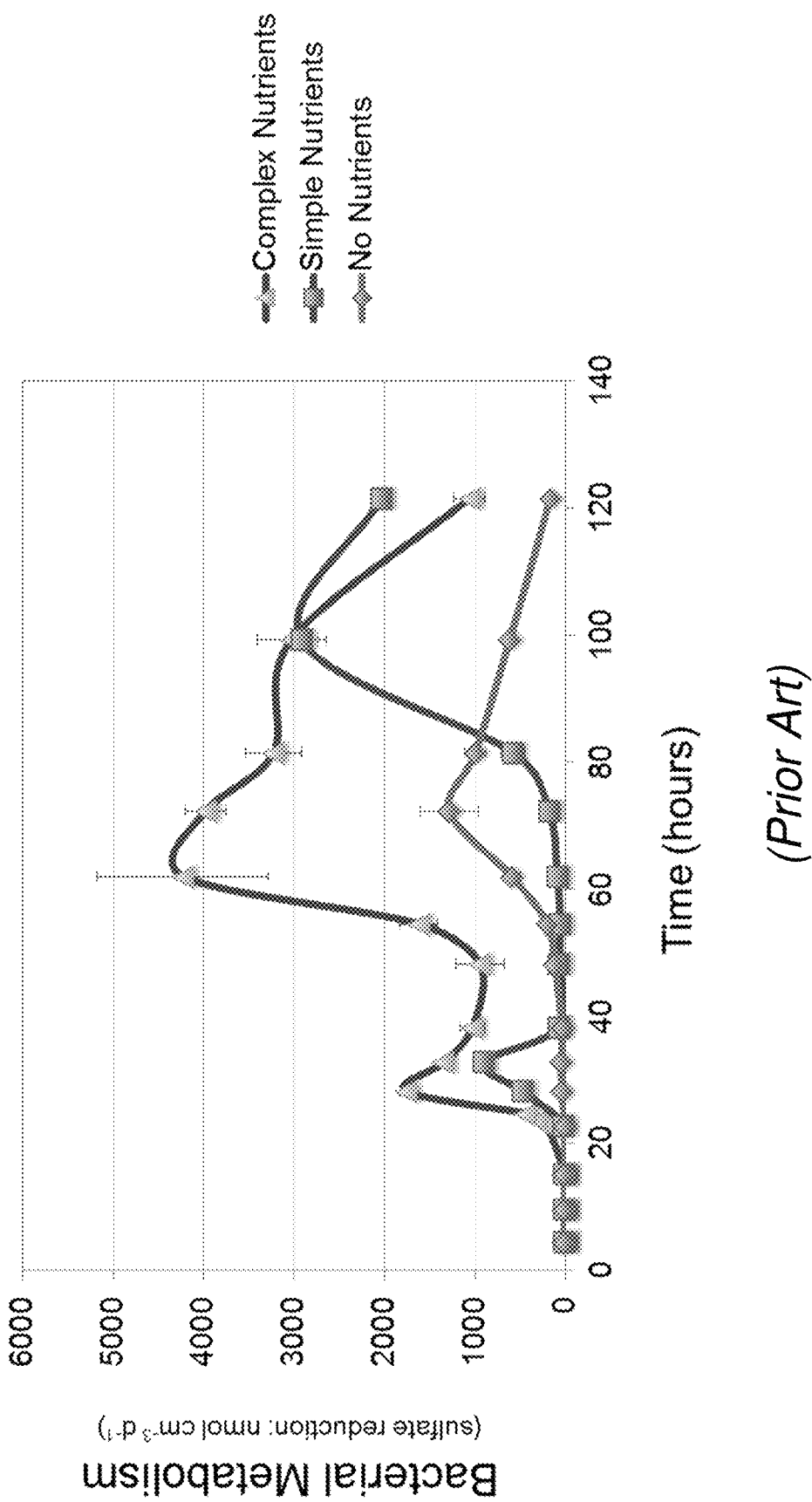
FIG. 8 shows a time-resolved line graph of the data presented in FIG. 7 of the prior art.

Microorganisms with thermal limits for growth that are higher than the prevailing in situ temperature are known to exist in sediments, as shown in FIGS. 7 and 8, and described further in this document. These microorganisms typically exist as part of the inactive or dormant seed bank unless or until environmental conditions change, e.g., by heating or through the provision of nutrients. Prior to SAGD, a typical oil sands reservoir and overlying IHS will be approximately 10° C. in situ.

As the oil of the IHS and other less accessible regions is considered less accessible due to the extensive nature of low-permeability mudstone layers, and teachings of the prior art do not target oil recovery from IHS layers.

In one embodiment, the present invention utilizes the conductive heat generated by existing thermal recovery methods such as SAGD. Although the high 200° C. temperatures of the injected steam effectively sterilize the steam chamber region itself, the steam cannot penetrate the mudstone layers of the IHS. Therefore, while the 200° C. steam chamber is sterilized, the surrounding areas of the subsurface are not necessarily sterilized because they experience a lower temperature. The present invention utilizes injected steam, which conducts heat through both the mudstone and the oil-saturated sand strata of the IHS region in contact with the SAGD chamber. This creates a temperature gradient from the edge of the hot steam chamber (~200° C.) to regions that are at ambient temperature (~10° C.)

For example, for a SAGD steam chamber that is ~400 metres below the subsurface, the temperature gradient due to heat conduction will extend upward tens of metres until an elevation where the ambient subsurface temperature does not change. As such, a large portion of the IHS will have temperatures that are much higher than prior in situ temperatures (<10° C.) but below what is understood to be the upper temperature limit for microbial life (~121° C.). These temperatures are favourable conditions for activating dormant members of the microbial seed bank, such as endospores of thermophilic bacteria that germinate and grow in response to the increase in temperature.

Furthermore, in this embodiment, given that the sediments and oil of the IHS are heated without additional input, the associated $CO_2$ greenhouse gas emissions and energy costs associated with oil production from a given operation do not necessarily increase. Hence the overall greenhouse gas emissions per barrel of oil decrease and the steam-to-oil ratio may decrease.

The conductive heat also reduces the viscosity of the oil, and mobilizes the oil that is otherwise inaccessible to steam in the regions beyond and/or above the steam chambers. However, although the heated oil in the IHS has a reduced viscosity to such a low level that it can flow, around 10 cP, there is limited pressure to drive it through the lowermost laterally extensive mud layers into the SAGD steam chamber where the production well is located (see FIGS. 1, 2 and 3).

In another embodiment, the present invention promotes gas production by the microorganisms in the IHS. The gas production in turn provides a pressure drive to produce the oil.

In one embodiment of the present invention, the proliferation of these microbial seed bank microorganisms is enhanced by optimizing environmental conditions for a given group or groups of microbes. This optimization may be provided by nutrient and/or injection of microbial cells into the IHS. In one aspect, the gas produced by the proliferating microbes provides pressure to drive the oil to a production well through the oil saturated intervals sandwiched between the laterally extensive, slightly inclined (often between 6 and 10 degrees) mud layers.

FIG. 7 shows a bar graph representing bacterial metabolism for sediment samples from the Arctic Ocean seabed under various nutrient and temperature conditions. This graph is adapted from Hubert et al. (2010) *Environmental Microbiology* 12:1089-1104 combined with unpublished data. The analyzed samples are representative of sediments from permanently cold (~4° C.) subsurface regions. As such, these samples include heterogeneous microbial communities including many strains. The samples were incubated for 5 days under four sets of conditions:

(1) ~4° C. without nutrients,
(2) ~50° C. without nutrients,
(3) ~50° C. with simple nutrients (1 mM of seven different organic acids, $C_2$-$C_4$ compounds, each), and
(4) ~50° C. with complex nutrients (2.5 mg·$cm^{-3}$ freeze-dried algae).

Microbial metabolism, a measure of microbial proliferation, was determined by measuring sulphate reduction in the experiments. At in situ temperature (~4° C.) and without nutrients, minimal microbial metabolism or activity is observed. Therefore, the thermophilic microorganisms in the sample may be considered dormant at in situ temperature. When the temperature was raised to 50° C., metabolism by thermophilic microorganisms became apparent, indicating a temperature dependent activation of dormant bacterial endospores.

Still referring to FIG. 7, the addition of simple nutrients at 50° C. enhanced microbial metabolism up to two-fold, and up to five-fold with more complex nutrients. Therefore, the activation of dormant sediment microorganisms may be fostered and increased by the addition of heat and nutrients, with more complex nutrients providing an environment significantly more conducive to growth and metabolism. FIG. 8 shows the three 50° C. groups presented in FIG. 7 as a line graph showing microbial metabolism over time. In addition to the relative proliferation of the microorganisms under different conditions, this graph further shows that the dormant microorganisms are activated up to 50 hours sooner when enriched with nutrients.

The type of gas produced by the microorganisms depends on the prevailing conditions, such as available nutrients, as well as the specific organisms of interest. Therefore, the gases produced include, but are not limited to, carbon dioxide, methane, nitrogen, ammonia, hydrogen and hydrogen sulfide.

Figure 9:
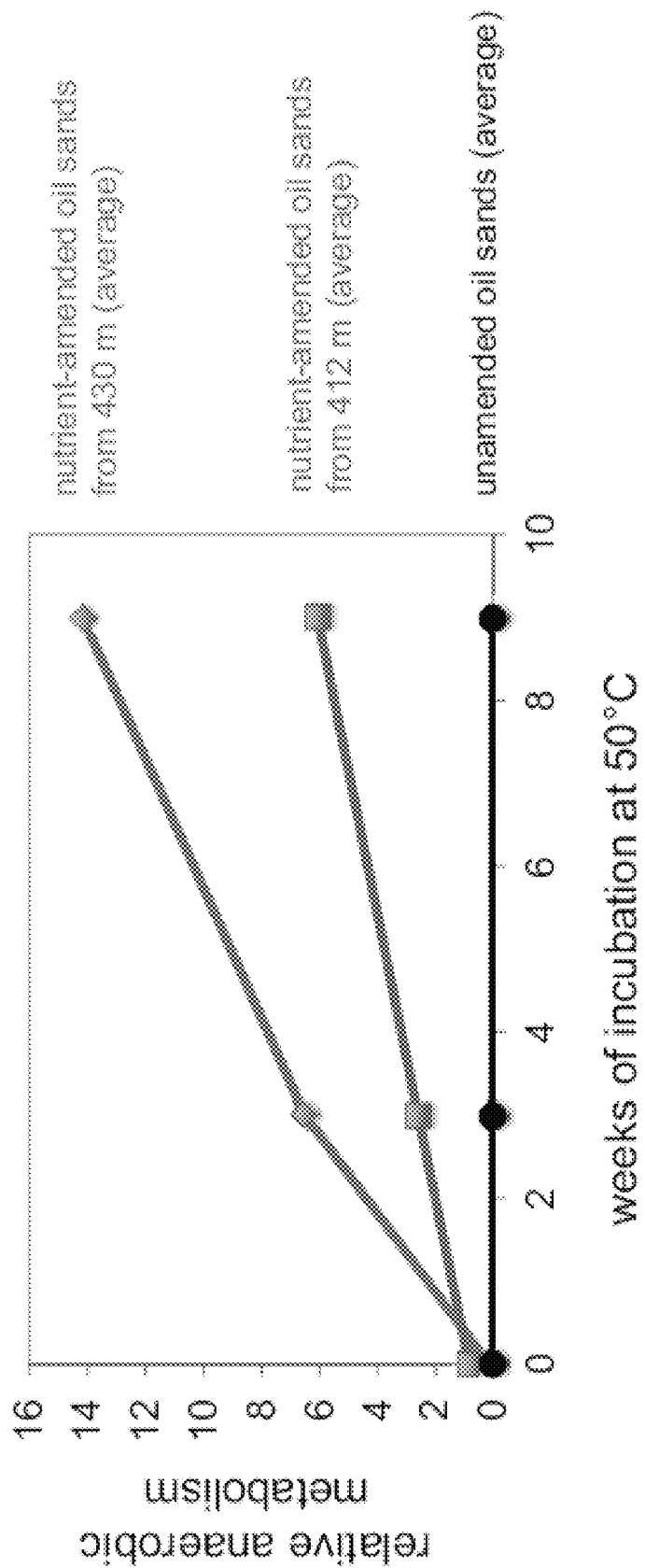
FIG. 9 shows a line graph tracking anaerobic bacterial metabolism as a function of time in oil sands samples incubated at 50° C.

Referring to FIG. 9, presented is a line graph tracking bacterial metabolism for sediment samples from an oil sands reservoir incubated at 50° C. This graph tracks anaerobic bacterial metabolism as a function of time in oil sands samples incubated at 50° C. in the presence of nutrients or with no nutrient amendment. Two depths from the same oil sands reservoir were tested, and the average from replicate experimental bottles for each condition is shown. The experiment is similar to the incubations shown in FIGS. 7 and 8, and demonstrates that dormant thermophiles can be activated in oil sands that experience high temperature. Nutrient amendment was required in order to stimulate anaerobic metabolism by thermophiles in the oil sands samples. These oil sands were obtained from frozen cores that were drilled prior to SAGD such that the only heating took place in the experiments. Two depths (ca. 412 and 430 m below surface) were tested, each in triplicate. Unamended controls for each depth were tested in duplicate.

Figure 10:
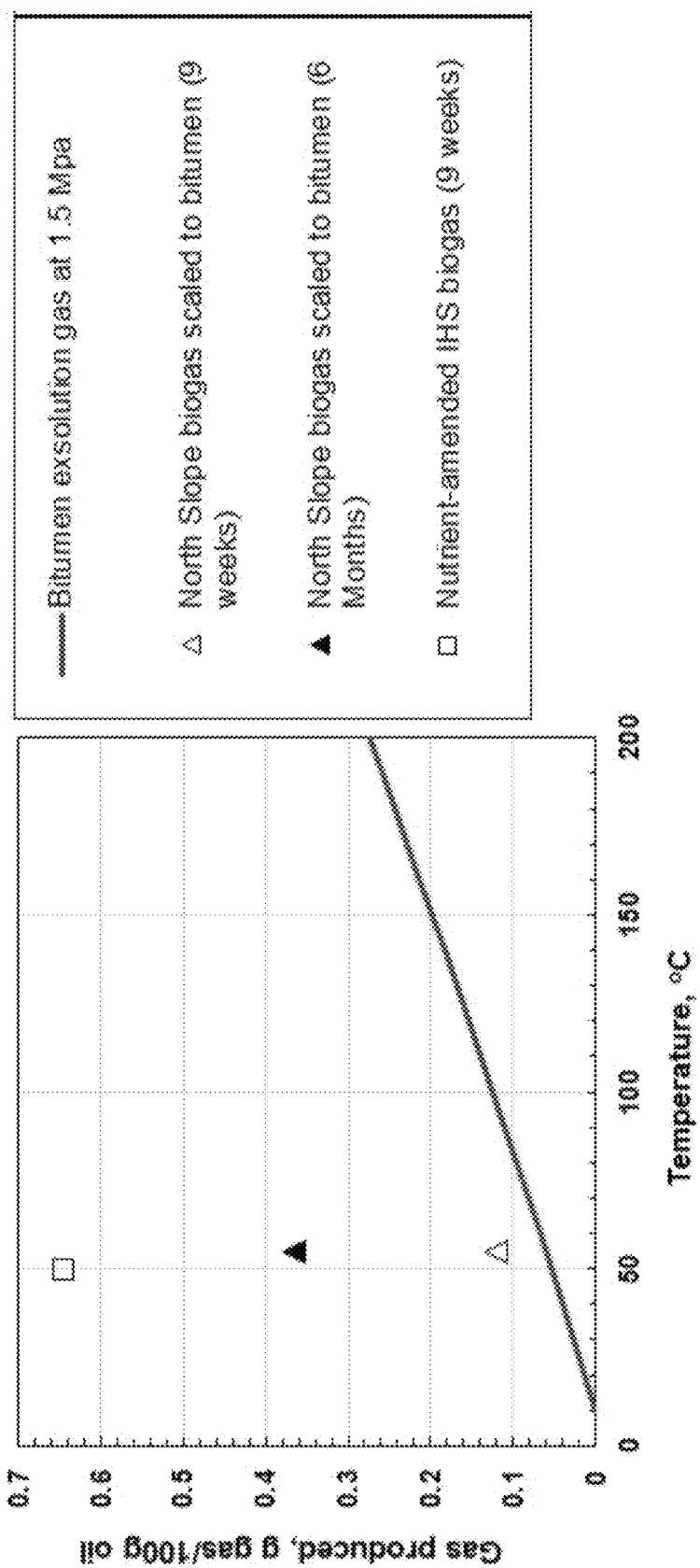
FIG. 10 shows a graph representing gas production from microorganisms found in Alaskan North Slope Oil Reservoirs, where the amount of gas produced has been scaled to what would be expected if the oil were bitumen, and nutrient-amended IHS biogas production, and bitumen exsolution gas are also shown.

FIG. 10 shows a graph representing gas production (methane) from microorganisms found in Alaskan North Slope Oil, where the biogas from oil is scaled to the biogas that would be expected if the oil were bitumen (using the relative saturates concentration in the respective oils), indicated by the triangles. Gieg et al., "Methanogenesis, sulfate reduction and crude oil biodegradation in hot Alaskan oilfields", 2010, Environmental Microbiology, 12: 3074-3086 is incorporated herein by reference and hereinafter referred to as "Gieg". Experimentally determined anaerobic metabolism by microorganisms found in IHS core samples was used to predict biogas generation in a second set of samples. The biogas generation from these two methods is compared to the predicted exsolution gas from a heavy oil saturated with gas at different temperatures and a reservoir pressure of 1.5 MPa (solid line). Motahhari et al., "Viscosity Prediction for Solvent-Diluted Live Bitumen and Heavy Oil at Temperatures Up to 175-deg-C.", 2013, Society of Petroleum Engineers is incorporated herein by reference and hereinafter referred to as "Motahhari".

Still referring to FIG. 10, the saturated heavy oil concentration was predicted using the equilibrium ratios from Standing's Correlation, presented in Ahmed, T. (2001). "Reservoir Engineering Handbook", (2nd ed.), Chapter 15. Elsevier, incorporated herein by reference and hereinafter referred to as "Ahmed", by mathematically combining a heavy oil and produced gas with composition defined by Motahhari. The exsolution gas was predicted by simulating the heating of this saturated oil under isobaric (constant pressure) conditions. The major assumption in applying Standing's Correlation is that the equilibrium ratios for each chemical component do not change with composition. The gas-to-oil ratio for this fluid is 0.5 wt % equivalent to about 7 $m^3/m^3$, which is high for bitumen, and which often range from 1-3 $m^3/m^3$.

Still referring to FIG. 10, data for methane generation from microorganisms in Alaskan North Slope Oil without added nutrients, provided by Gieg et al., was scaled to bitumen by the ratio of saturate fractions from the SARA (Saturates, Aromatics, Resins and Asphaltenes) analysis of each oil. Gas generation data was presented for 90 days at infrequent intervals. The observed maximum gas production was measured after 6 months. One assumption in this model is that the gas produced scales with the saturates content of the oils. Without any other exogenous nutrients or substrates, gas production in this case is derived from substrate compounds in the C7-C34 alkane (single bonded, non-cyclic molecules) fraction. C7-C34 alkane content is not a common measurement in crude oil assays, so the saturate content (which includes cyclic hydrocarbons) was used as a proxy to estimate the C7-C34 alkane content measurement.

Still referring to FIG. 10, core samples from the IHS were mixed with a nutrient formulation and incubated at 50° C. in the lab. Metabolites were measured over time to determine the anaerobic metabolism in these systems. Metabolite concentrations were converted on a mole to mole basis to gas generation by the microorganisms in the IHS sample.

Figure 11A:
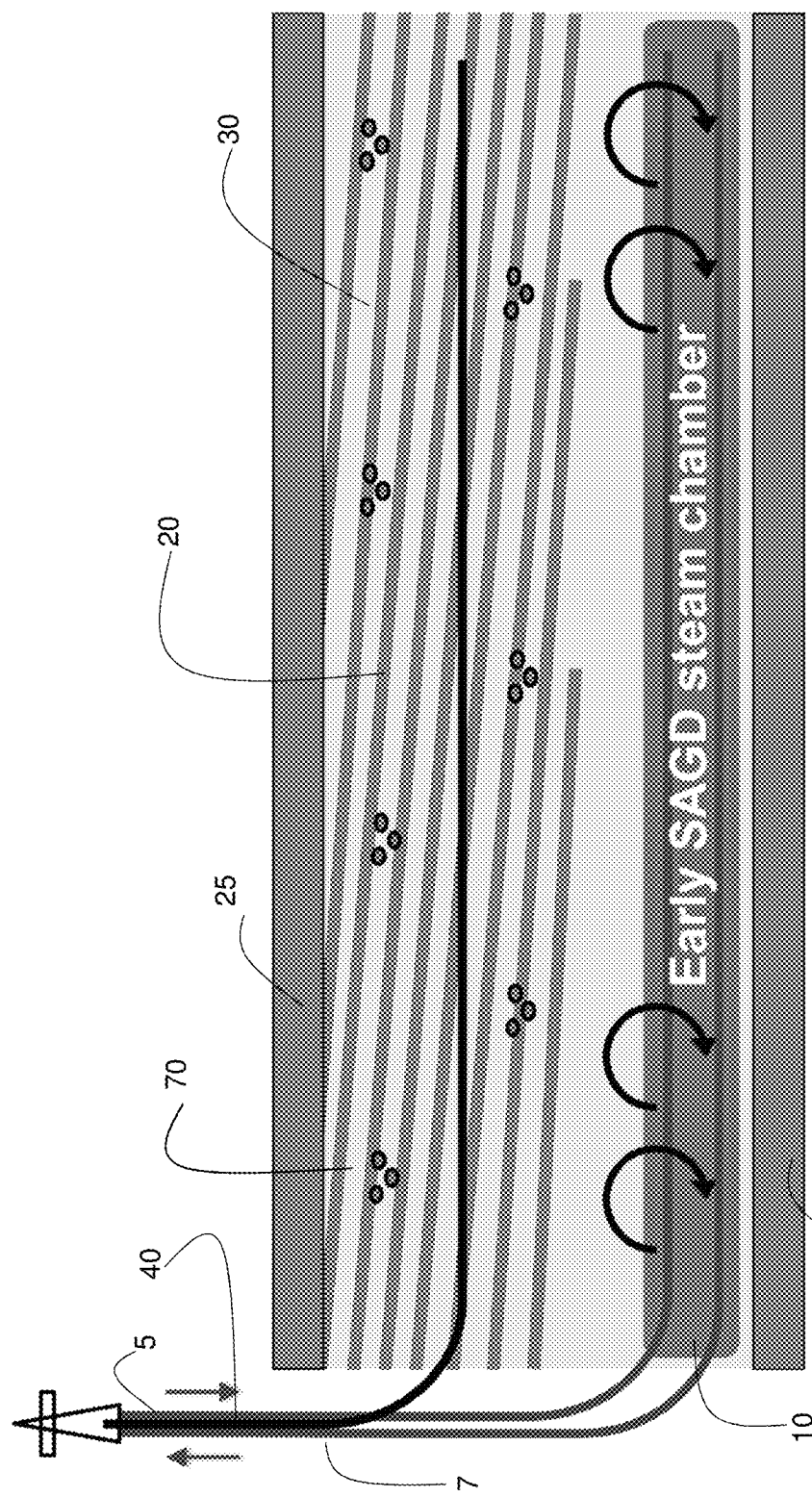
FIGS. 11A, 11B, and 11C show three phases of MiSAGD, including a schematic of a long horizontal nutrient injection well drilled into the IHS region above the SAGD steam chamber of an embodiment of the present invention.
Figure 11B:
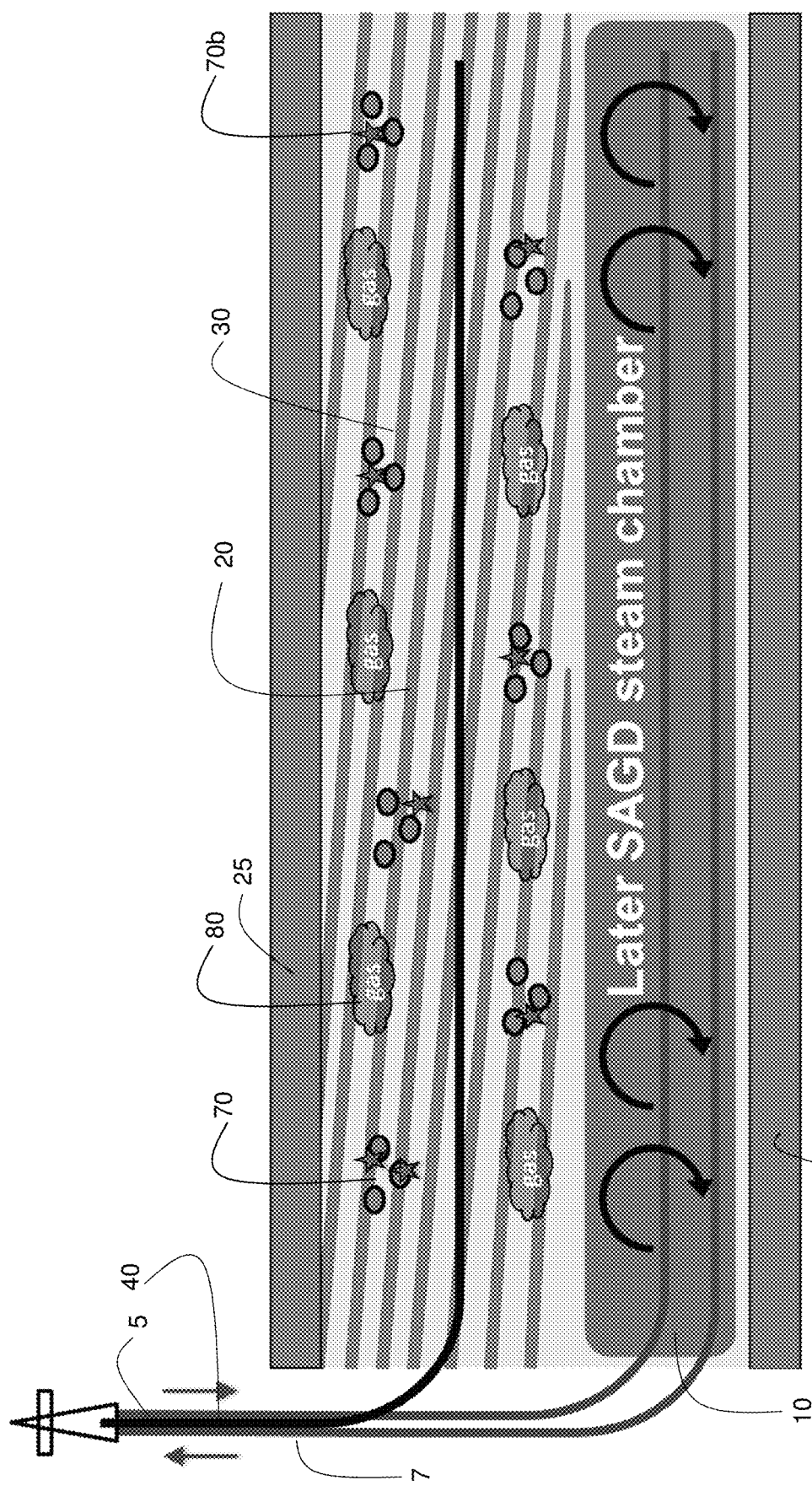
Figure 11C:
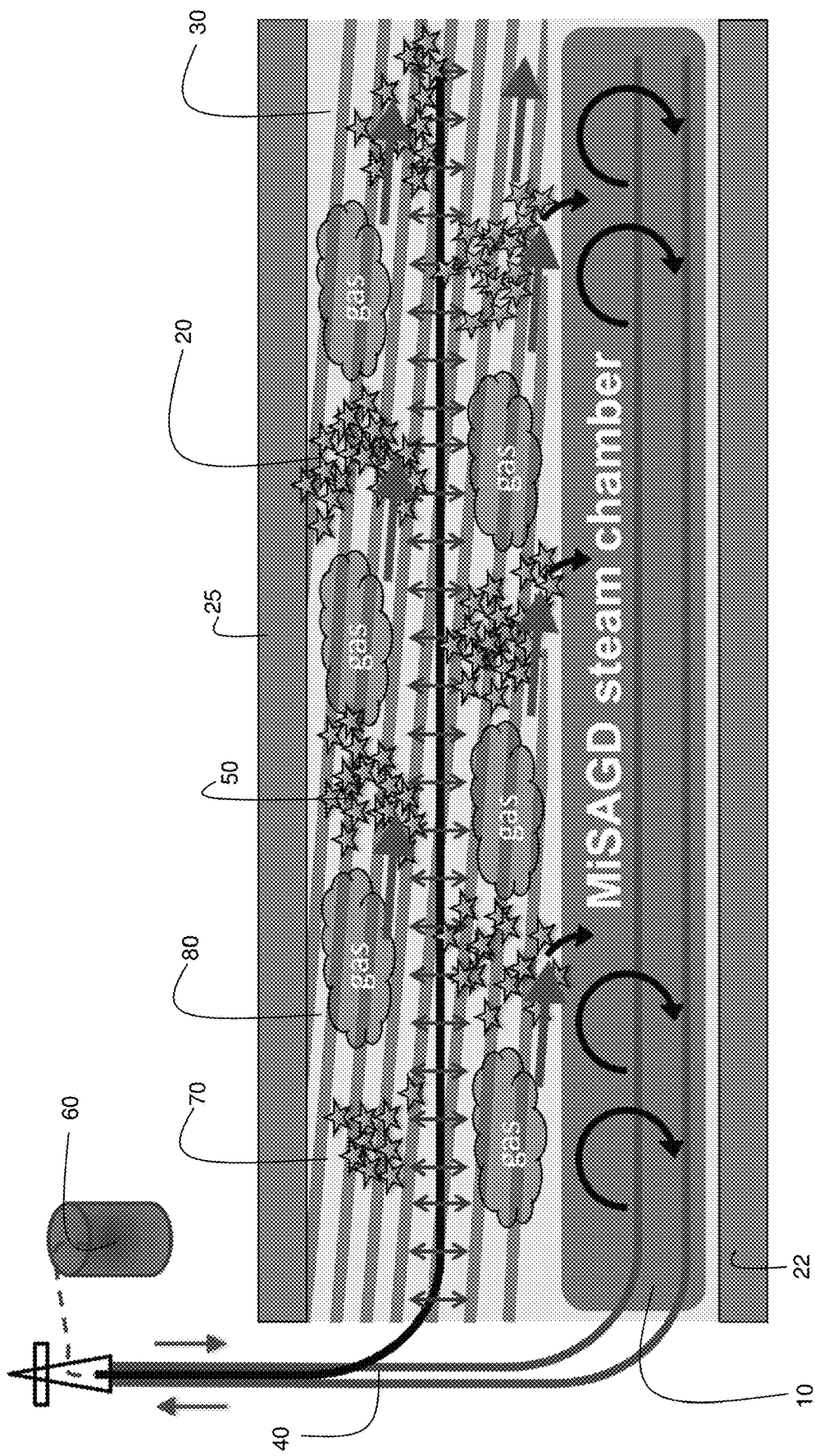

FIGS. 11A, 11B, and 11C show a schematic of one embodiment of the present invention. In this embodiment, a long horizontal nutrient injection well 40 is drilled into the IHS region 20 above the SAGD steam chamber 10. In the embodiment shown in FIG. 11B, gas 80 may be generated by microbes that are activated in response to the conductively heated IHS layers. In the embodiment shown in FIG. 11C, nutrients 50 are injected from a tank 60 on the surface. The injected nutrients 50 are incubated in the conductively heated IHS region 20 during SAGD, occurring in the steam chamber 10 below. Dormant microorganisms 70 that may be activated by the conductive heat as shown in FIG. 11B, are further activated and enhanced by the injected nutrients 50, to produce gas 80. In one embodiment, the gas 80 produced by the activated thermophilic microbes 70 provides pressure for oil lying between the laterally extensive mud strata 30 to flow downwards along the inclined mud strata into the steam chamber 10 below for oil production.

In another aspect of the present invention, the microbial gas production is enhanced by determining and utilizing optimal nutrient formulations and temperature conditions to promote maximum microbial activation and proliferation. Nutrient formulations may be designed based on either (1) specialized knowledge of the microbial seed bank and anaerobic microbial metabolism, or (2) formulations based on the specific microbial community present in a given reservoir. The latter formulations may be prepared by site-specific pre-characterization lab testing of the microbial seed bank of a given IHS region using samples taken from that IHS region. The pre-characterization may include studies on how best to stimulate the microbial particular seed bank at different anticipated temperatures. The samples of IHS sediments would typically be available from drill cores taken during an exploration survey of the subsurface, or during the process of drilling the SAGD injector-producer well pairs.

Figure 6:
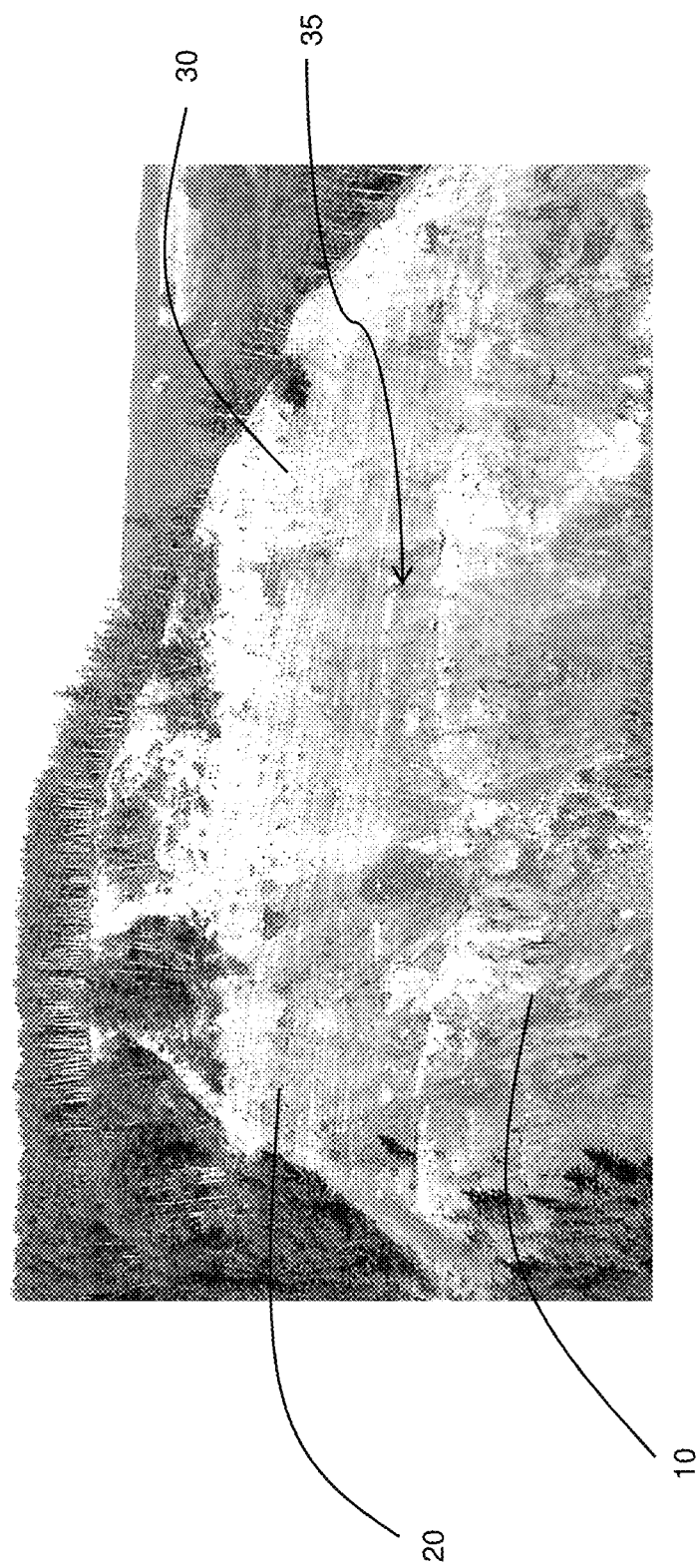
FIG. 6 shows a photograph of an Athabasca Oil Sands outcrop near Fort McMurray in Alberta, Canada.

The nutrient formulations may include growth substrates that are carbon-based organic compounds, nitrogen, sulfur and phosphorous compounds, iron, manganese and other metal compounds, vitamins, or different electron acceptors like oxygen, nitrate, metal oxides and sulfates. Carbon-based organic compounds may include, but is not limited to complex compounds such as molasses, municipal wastewater, freeze dried algae or other biomass, yeast extract, tryptic soy broth, peptone and extracts from food processing. Carbon-based organic compounds may also include less complex compounds such as light hydrocarbons or solvents like toluene and short chain organic acids like lactate, butyrate, propionate, and acetate. For example, FIG. 6 shows a two-fold increase in bacterial metabolism with less complex compounds and up to five-fold increase when using complex compounds. Less complex compounds are typically the break-down products of the bacterial metabolism of the complex compounds. Different types of bacteria are typically required to convert complex nutrients to less complex nutrients and less complex nutrients to gas. Therefore, the use of simple or complex nutrients will depend on the types of bacteria being targeted in a given reservoir.

The nutrient formulations may be specialized and site-specific as described above, or may be standardly applied based on specialized knowledge of general physiology of anaerobic microbial consortia capable of gas production. Some of the nutrients mentioned above may be present in low concentrations in the reservoir. However, the nutrient formulation of the present invention would typically contain much higher concentrations of the nutrients.

Figure 1:
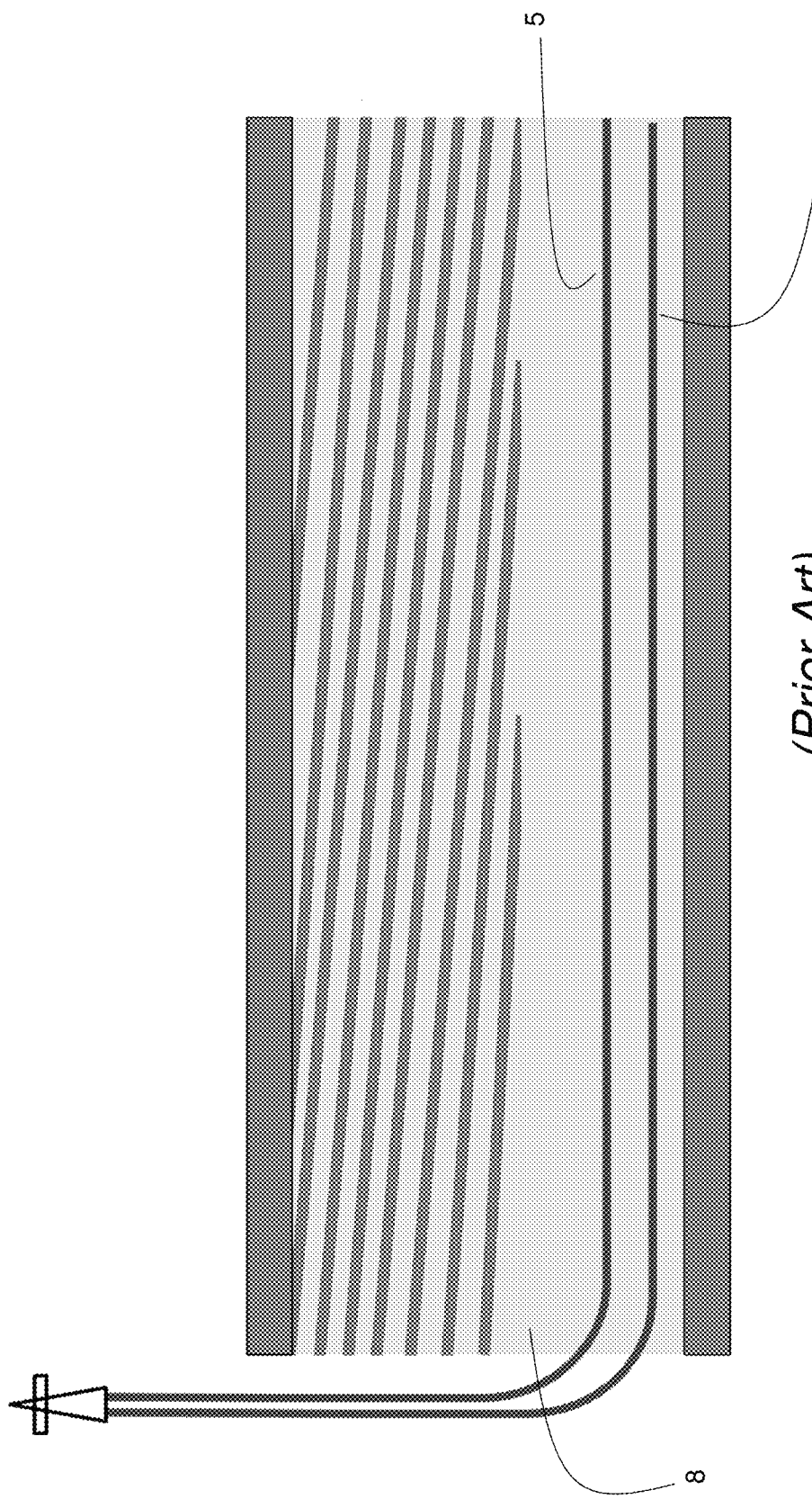
FIG. 1 shows a schematic of an example of an oil sands geological unit in the subsurface of the Earth with an injector-producer well pair for typical SAGD of the prior art.
Figure 2:
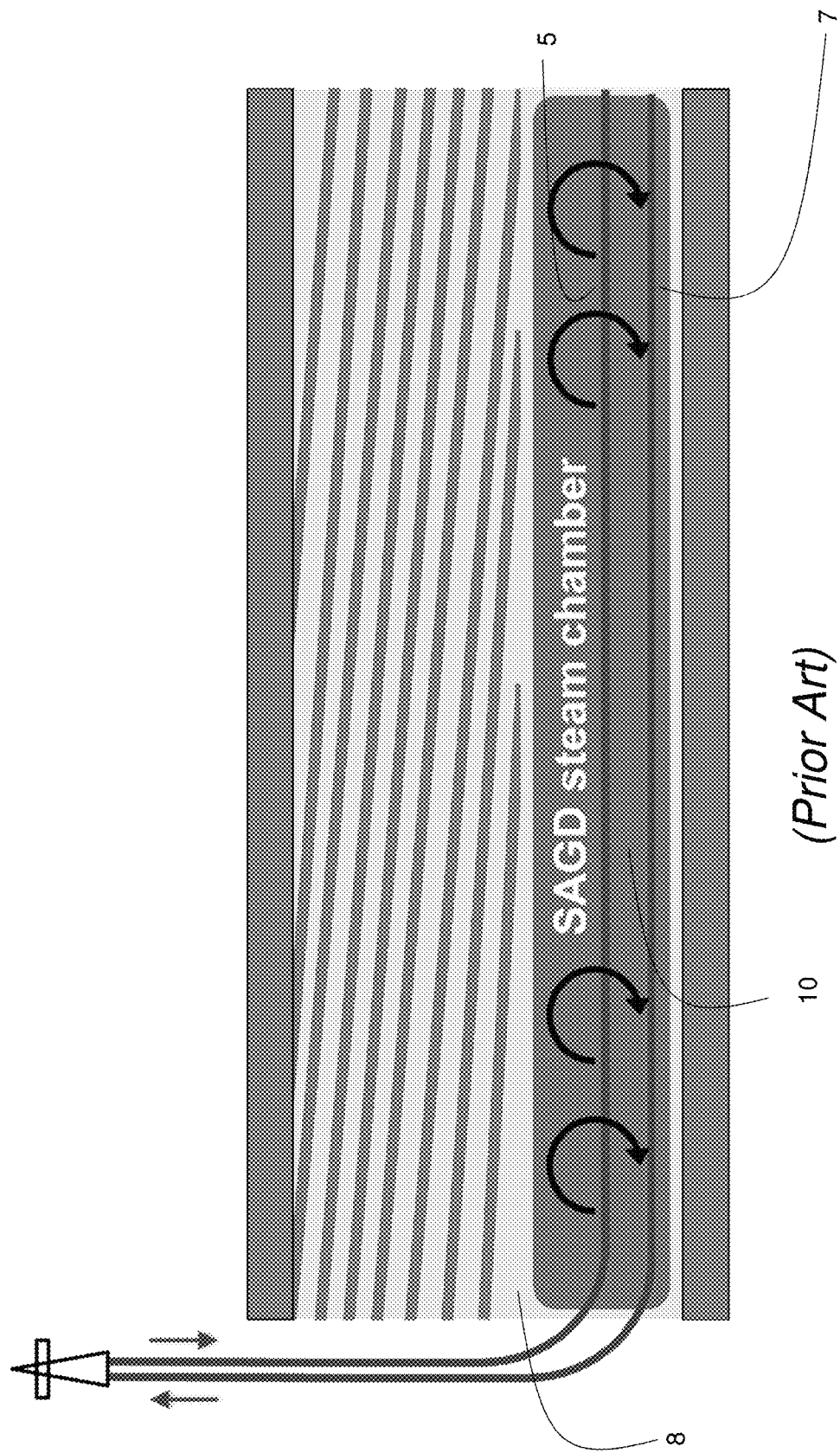
FIG. 2 shows a schematic of an example of an oil sands geological unit in the subsurface of the Earth with an injector-producer well pair for typical SAGD, and the resulting steam chamber of the prior art.
Figure 3:
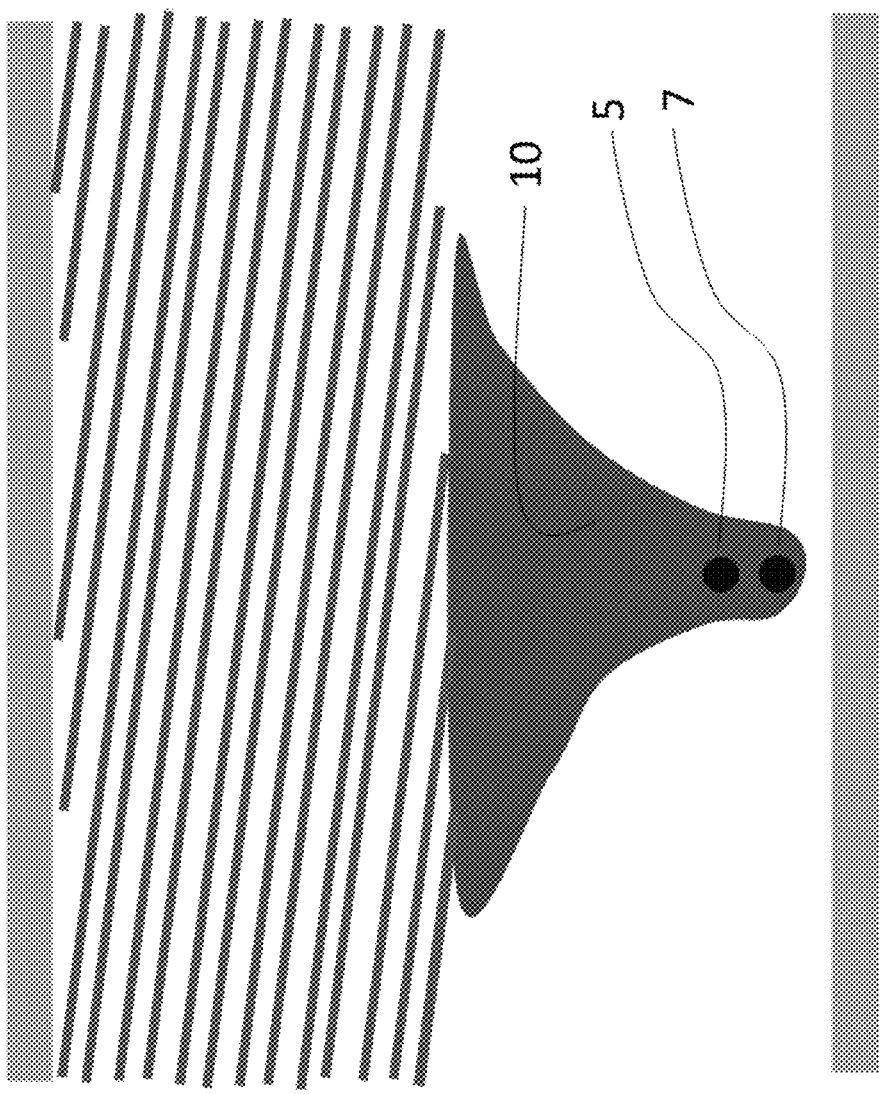
FIG. 3 shows a cross-sectional schematic of an example of an oil sands geological unit in the subsurface with an injector-producer well pair for typical SAGD, and the resulting steam chamber of the prior art.
Figure 4:
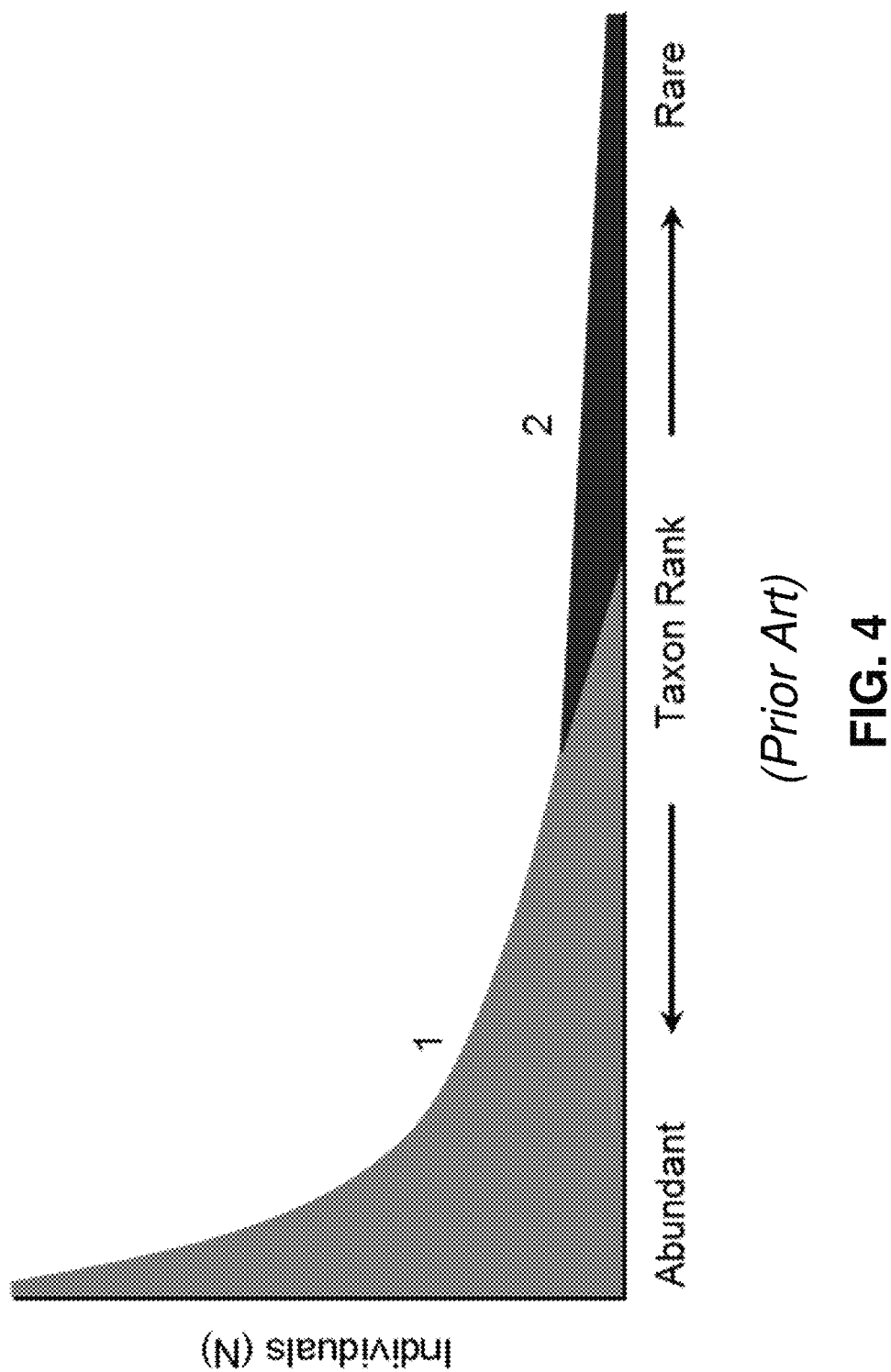
FIG. 4 shows a histogram of the abundance rank order of all microbial taxa in a subsurface environmental sample of the prior art.
Figure 5:
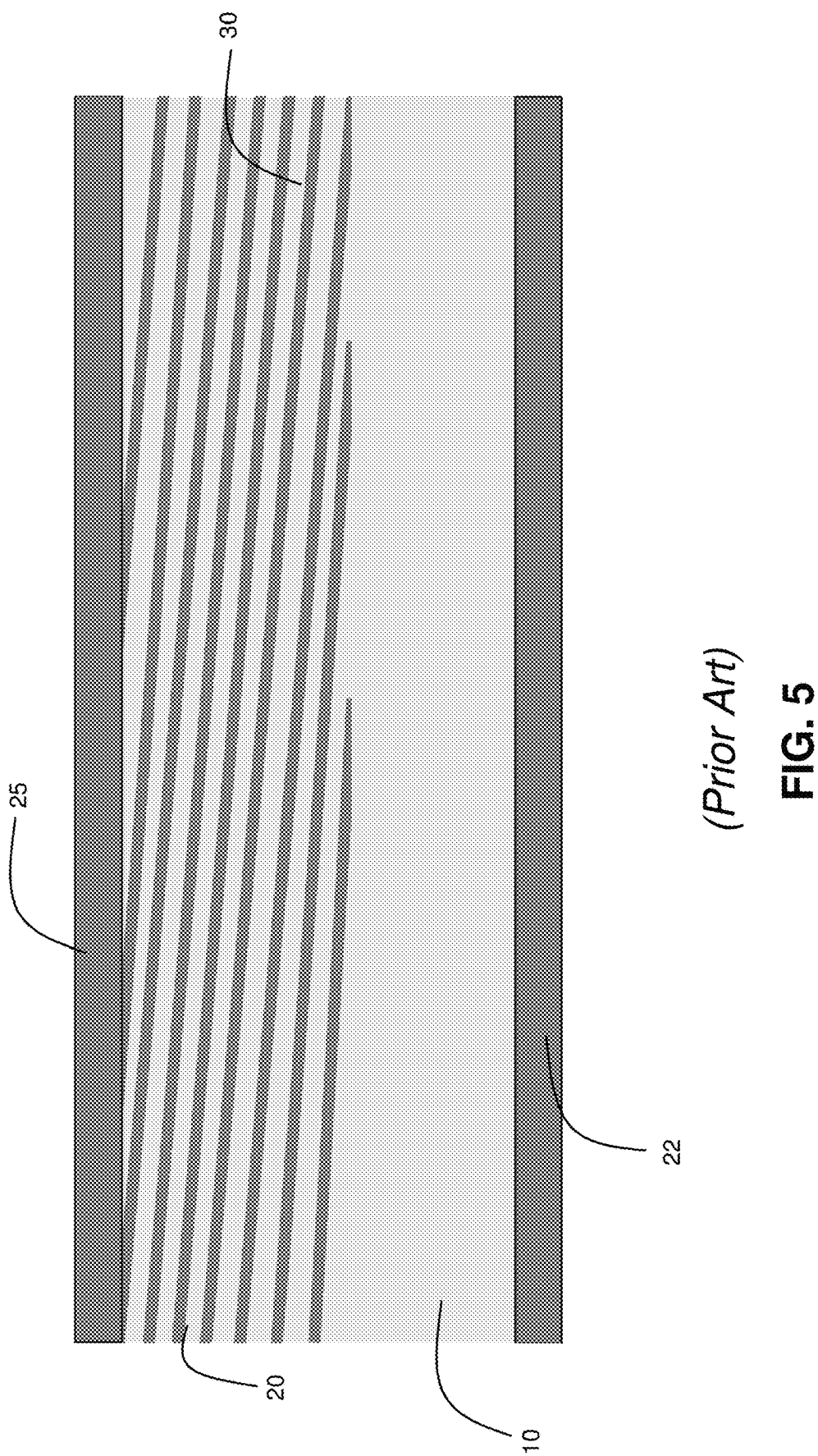
FIG. 5 shows a schematic of an example of a known oil sands geological unit in the subsurface of the Earth.

In one embodiment, the present invention aims at driving the oil towards the steam chamber along the gentle inclination of the laterally extensive mud strata rather than attempting to break down the mudstone boundary of the steam chamber as in existing techniques. As such, in some embodiments, the present invention utilizes existing oil production wells 7, for example as shown in FIGS. 1, 2 and 3, to produce the oil from the IHS region. In some embodiments of the claimed invention, additional production wells are drilled into the IHS region.

An advantage of some embodiments of the present invention includes a reduction in oil production costs per barrel of oil produced relative to the traditional SAGD method, because the costs associated with nutrient injection are likely lower than those of steam generation. As such, embodiments of the present invention will yield a considerable increase in oil production with only an incremental cost increase for additional nutrient wells, and without any change of the SAGD method.

A further advantage of embodiments of the present invention is that it seeks to decrease the steam-to-oil ratio. Therefore, with the same amount of steam in the traditional SAGD method, embodiments of the present invention allow for a significantly larger amount of oil to be produced, and thereby may reduce the relative amount of greenhouse gas emissions per unit of oil production.

Additionally, as the oil in the IHS region is less biodegraded and viscous than that of the steam chamber, it is more commercially valuable. Further, the decreased viscosity requires less energy to flow through the oil production wells.

Furthermore, when heated, the less-biodegraded oil of the IHS region is amenable to supporting the gas-producing microbial activity if it can still be further biodegraded. As such, in some embodiments of the present invention, the oil naturally present in the IHS region may contribute as a form of nutrients for microbial growth.

In another embodiment of the present invention, gas-producing microorganisms may be injected in the subsurface as a form of bioaugmentation. Site specific lab testing is required to determine ideal nutrient and/or bioaugmentation formulations. In one embodiment of the present invention, the gas-producing microorganisms may originate from seed bank microorganisms isolated and cultured from corresponding reservoir core samples. In another embodiment of the present invention, the injected gas-producing microorganisms may be standard microbial species or consortia known to produce gas under high temperature anoxic conditions.

In some embodiments of the present invention, it may be desirable to access a large portion of the subsurface region. As such, the present invention contemplates embodiments including more than one nutrient injection well. The nutrient injection wells may be drilled with different widths, depths (shallow or deep), horizontally, directionally, and/or vertically depending on the targeted area for nutrient injection. The decision to drill fewer or more nutrient injection wells, or horizontal and/or vertical wells, may be determined based on the characteristics of a particular reservoir and calculated cost/benefit ratios.

In some embodiments of the present invention, horizontal wells may be used to target the stimulation of particular areas in the geological unit based on temperature or microbiological conditions. In another embodiment of the present invention, the horizontal wells may be similar to the horizontal SAGD wells. The horizontal wells may also be up to 1 km long or longer horizontally and/or access the entire oil reservoir area.

In one embodiment of the present invention, the nutrient injection wells may be drilled from the same surface location or infrastructure as existing production wells, such as the SAGD production well pads. Therefore, in such embodiments where the technology is employed in conjunction with another oil recovery method such as the SAGD method, these additional wells are likely to represent a smaller incremental deployment cost.

Figure 13:
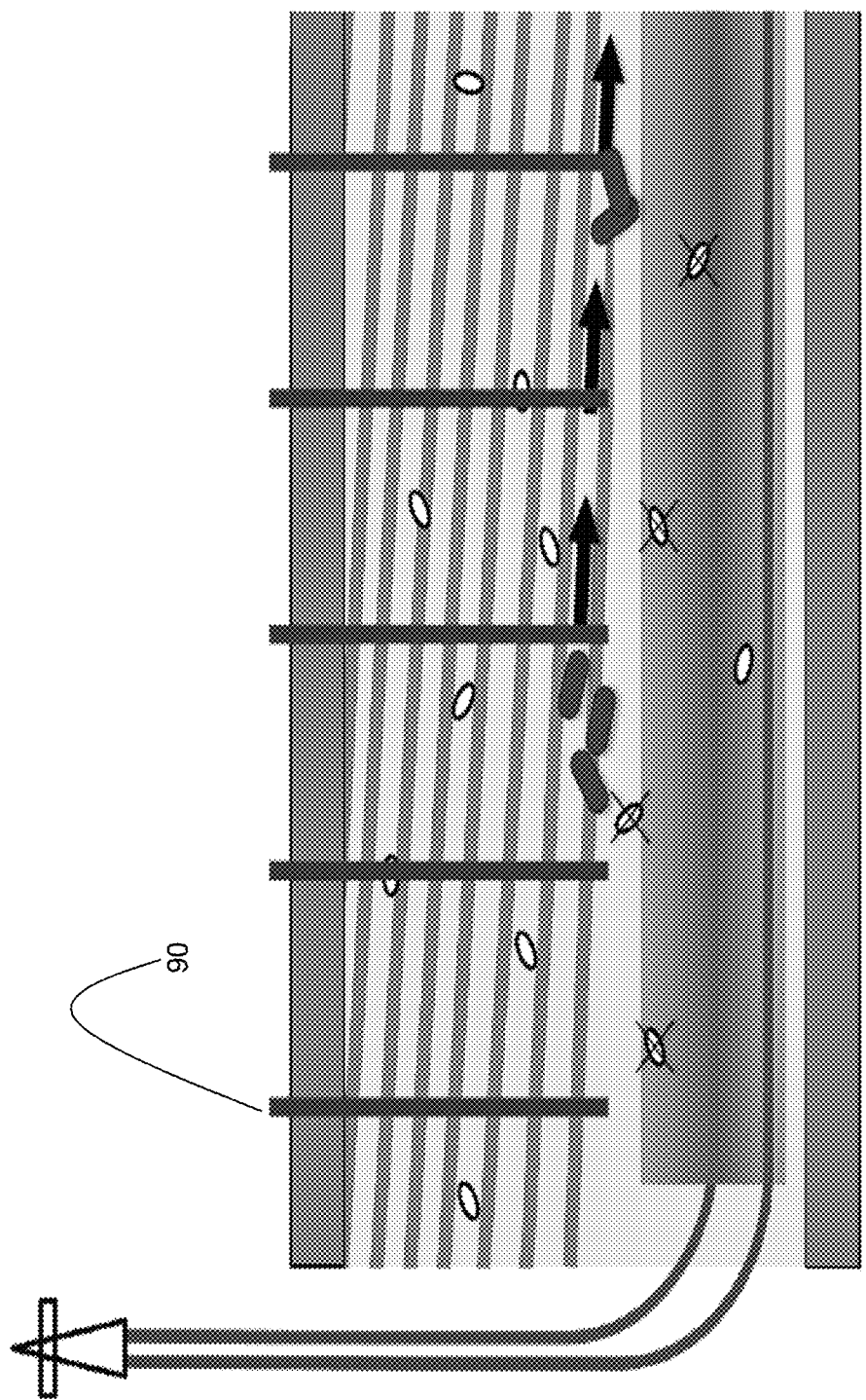
FIG. 13 shows a schematic of a vertical well implementation according to another embodiment of the present invention.

In one embodiment of the present invention, existing vertical delineation wells, drilled for mapping and exploratory purposes prior to SAGD, may be utilized as injection wells. FIG. 13 shows a schematic with existing vertical delineation wells 90. The present invention also contemplates adding any type of vertical well, regardless of whether vertical wells previously exist at the reservoir.

In another embodiment, the present invention may be utilized in a normally inaccessible zone such as the IHS region before or after the SAGD method. The heat generated from thermal oil-recovery strategies such as the SAGD method is only accessible while the SAGD method is active and ongoing. Therefore, when the present invention is utilized before or after the SAGD method, warm water may be injected as a thermal enhancement to maintain optimal temperature conditions for microbial seed bank activation, microbial proliferation and gas production. The warm water may be injected continuously or periodically. In some embodiments of the present invention, the warm water may be injected with nutrients and/or microbes.

In one embodiment of the present invention, the warm water may be injected during the SAGD method to supplement the heat of a particular region of the IHS.

In another embodiment, and as may be understood by the skilled artisan, the present invention may be utilized in tight oil reservoirs (also known as light tight oil, shale hosted oil, or colloquially as shale oil). Inconsistent gas content is a major contributor to the variable success of producing oil from tight reservoirs. Tight oil reservoirs require high gas content to drive the oil to the production well. The present invention may be used to generate the extra gas needed to increase production in viable reservoirs or target formations that were otherwise uneconomic because of their low gas content.

Hydraulic fracturing is often used to extract oil from tight oil reservoirs. The nutrient formulations of the present invention may be injected into the reservoir before, during or after the fracturing process. The combination of nutrients and change in temperature of the reservoir can stimulate the activation of dormant microbes, and subsequently gas production from microbial activity. After a period of incubation, the microbial gas production may contribute to the gas drive required to move the oil to the production wells.

In another embodiment, the method of the present invention may involve site-specific local surveillance testing and preparations for enhanced oil recovery, including:

(i) sampling of subsurface reservoir core(s) from oil reservoir site(s) of interest, for example, IHS core samples;

(ii) microbial diversity analysis targeting rare seed bank organisms and lab-based characterization of in situ reservoir microbial communities in sediments—these may involve temperature gradient incubations that simulate the SAGD conductive heating of overlying IHS;

(iii) lab-based determination of substrates, nutrients, temperatures that are optimal for gas production from microbial communities that are dormant, but present, in sediments from site of interest;

(iv) simulation of thermal heating over time, for example through modeling of steam chamber conductive heating, to identify high temperature conditions for optimal microbial gas production based on the physiology of seed bank microorganisms without further intervention;

(v) modeling of additional gas production if nutrients are provided to the dormant microbial community, and/or looking for the germination of bacterial endospores that may occur in response to temperature and/or nutrients; and (vi) implementation of the improved oil recovery strategy at the oil reservoir site of interest.

The present invention includes a method for recovering oil from an oil reservoir in the subsurface of the Earth. In this method, an injection well is provided in the subsurface for injecting at least one nutrient. A heat source is provided to continuously heat the subsurface, before during or after the injection of the at least one nutrient. The gas-producing microorganisms located in the subsurface are incubated for producing gas pressure which drives the oil to the production well for recovery.

In one embodiment, the present invention includes a method for recovering oil from an oil reservoir in the subsurface of the Earth. In this method, an injection well is utilized in the subsurface for injecting at least one nutrient. A heat source is utilized to heat the subsurface, before during or after the injection of the at least one nutrient. The gas-producing microorganisms located in the subsurface utilize the at least one nutrient to generate gas pressure, which drives the oil to the production well for recovery.

In a further embodiment, the present invention includes a method for recovering oil from an oil reservoir in the subsurface of the Earth. In this method, an injection well is utilized in the subsurface for injecting at least one nutrient. The temperature of the subsurface is changed. At least one gas-producing microorganism is injected in to the subsurface. The gas-producing microorganisms utilize the at least one nutrient to generate gas pressure which drives the oil to the production well for recovery.

In a further embodiment, the present invention includes a method for recovering oil from an oil reservoir in the subsurface of the Earth. In this method, an injection well is utilized in the subsurface for injecting at least one nutrient. The temperature of the subsurface is changed. At least one gas-producing microorganism is stimulated for producing gas pressure which drives the oil to the production well for recovery. The gas-producing microorganism may be injected in to the subsurface, or naturally present in the subsurface.

In one embodiment of the present invention, the injection, incubation and production steps outlined above may be repeated cyclically. In another embodiment of the present invention, the oil production may be concurrently performed with the incubation of the microbes with injected nutrients.

In a further embodiment, the present invention may be applied to microbial seed bank organisms in subsurface heavy oil reservoirs that are currently not accessible by, or attractive for, conventional and/or thermal recovery (i.e. SAGD) methods, such as relatively thin layers of oil-saturated sand. In such thin reservoir zones, the SAGD method is not generally employed as it is considered to be not economically justifiable. In this embodiment, as the thermal energy cannot be obtained from a concurrent thermal strategy such as the SAGD method, the thermal energy must be introduced to the sediment by another means.

Figure 12A:
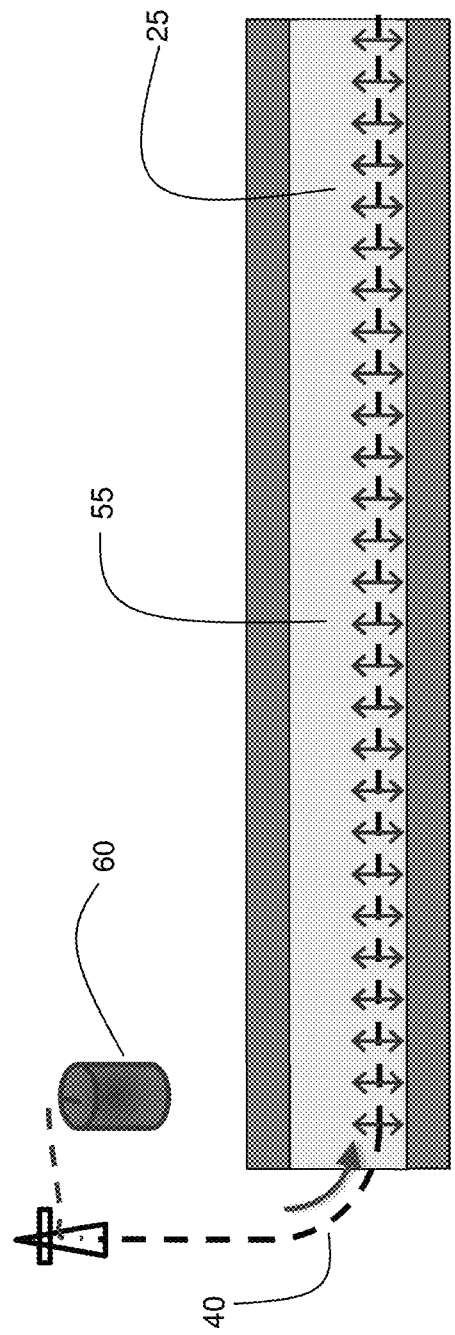
FIGS. 12A, 12B show schematics of the two phases of one embodiment of the present invention, where thermal energy is provided by the injection of warm water and nutrients, followed by oil being recovered.

In one embodiment of the present invention, thermal energy may be provided to the target area by the injection of warm water as previously mentioned. FIG. 12A shows the first phase of such an embodiment. A nutrient injection well 40 injects warm water, nutrients, and optionally, microbes 55 from a tank 60 above the surface. In one embodiment of the present invention, the warm water, nutrients, and optional microbes 55 are steadily flowed into the oil reservoir 25 to reduce viscosity by heat and activate and incubate the microbial community, including the dormant seed bank, for it to produce gas that provides pressure drive for oil production.

Figure 12B:
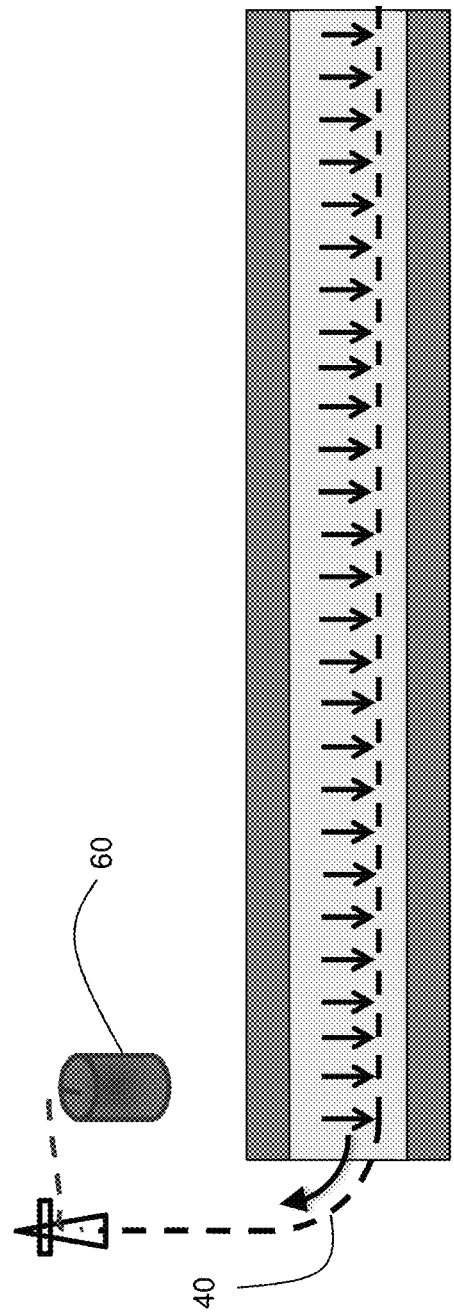

FIG. 12B shows one embodiment of the second phase of the embodiment of the present invention shown in FIG. 12A. In this embodiment, the nutrient injection well 40 may also serve the function of a production well. In one embodiment, the heated and therefore less viscous oil is driven by the gas produced by the microorganisms in phase One (FIG. 12A) toward the well for production (FIG. 12B).

The temperature of the warm water may vary depending on the targeted microbial community's preferences. The warm water heats the sediments, and along with the nutrients, reduces the viscosity of the oil, and may contribute to pressurizing the reservoir. Thus, the high temperature-adapted microbes are activated and proliferate to produce gas that increases in situ pressure, leading to enhanced flow and oil production.

In one embodiment of the present invention, the warm water may be injected to facilitate oil production, and the injection/production cycle continues to be repeated. In some embodiments, the period of injection/production cycles may be reservoir specific and may be determined by prior attempts at conventional cold temperature oil production.

In one embodiment of the present invention, such alternating cycles may continue until oil production ceases. In another embodiment of the present invention, the incubation of the microorganisms in the subsurface sediments with warm water and nutrients may last beyond several months.

In a further embodiment of the present invention, the oil production may last up to 6 months and beyond.

In some embodiments of the present invention, the nutrient injection wells and/or warm water injection wells may also be used for oil production.

In some embodiments of the present invention, the supplemental thermal energy provided by warm water may be used to supplement primary cold temperature oil production or secondary oil production such as waterflood technology.

In one embodiment of the present invention, the subsurface may be cooled using relatively cold water or other cooling methods to target a temperature-adapted microbial community. In the context of oil production, it is well understood that oil production occurs in both land-based and offshore locations, and relies on nearby water sources. In the context of oil production, it is also well understood that nearby land-based water sources are often lake water or river water or shallow groundwater. Likewise, in the context of offshore oil production, it is also well understood that the presence of sea water will exist and be used for oil production purposes. Still further, in the context of these water sources, it is well understood that this water is relatively cold water. Likewise, it should be well understood that microorganisms are present in the sources of water. In this particular embodiment, the cold water or other cooling method cools the reservoir sediments, along with the microbial community and contributes to pressurizing the reservoir. Thus, the temperature-adapted microbes are activated and proliferate to produce gas that increases in situ pressure, leading to enhanced flow and oil production.

A person understanding this invention may now conceive of alternative structures and embodiments or variations of the above, all of which are intended to fall within the scope of the invention as defined in the claims that follow.

The invention claimed is:

1. A method for oil recovery in a subsurface of an oil reservoir, the method comprising steps of:
   (a) utilizing at least one injection well within the subsurface;
   (b) utilizing a heat source to heat the subsurface to a temperature that is between above an in situ temperature and an upper limit for microbial life, and stimulate activity of at least one in situ dormant microorganism from a microbial seed bank located in the subsurface to produce a gas pressure within the subsurface; and
   (c) utilizing the gas pressure in recovery of subsurface oil through a production recovery well.

2. The method according to claim 1, further comprising:
   (a) conducting testing to determine an optimal nutrient formulation that includes at least one nutrient to stimulate activity of the at least one dormant microorganism; and
   (b) injecting the optimal nutrient formulation into the subsurface through the at least one injection well.

3. The method according to claim 1, wherein the heat source is a conductive heat byproduct of a steam assisted gravity drainage oil recovery.

4. The method according to claim 1, wherein the heat source includes warm water or a warm nutrient formulation.

5. The method according to claim 1, wherein the at least one injection well is also the production recovery well.

6. The method according to claim 1, further comprising injecting at least one gas-producing microorganism into the subsurface through the at least one injection well.

7. The method according to claim 6, further comprising conducting testing to determine an optimal bioaugmentation formulation that includes the at least one gas-producing microorganism to produce gas in the subsurface.

8. The method according to claim 7, wherein the optimal bioaugmentation formation further includes at least one of: at least one nutrient; at least one gas-producing microorganism isolated and cultured from a test sample; or at least one gas-producing microorganism known to produce gas under high temperature anoxic conditions.

9. The method according to claim 1, wherein the at least one dormant microorganism is one of: a thermophilic endospore forming bacteria; a mesophilic endospore forming bacteria; a non-spore forming bacteria; or an archaea.

10. A method for oil recovery in a subsurface of an oil reservoir, the method comprising steps of:
(a) utilizing at least one injection well within the subsurface;
(b) utilizing a change in temperature of the subsurface, wherein after the change, the temperature of the subsurface is one of: between above an in situ temperature and below an upper limit for microbial life; or between below the in situ temperature and above a lower limit for microbial life, to stimulate activity of at least one in situ dormant microorganism from a microbial seed bank located in the subsurface to produce a gas pressure within the subsurface; and
(c) utilizing the gas pressure in recovery of subsurface oil through a production recovery well.

11. The method according to claim 10, further comprising:
(a) conducting testing to determine an optimal nutrient formulation that includes at least one nutrient to stimulate activity of the at least one dormant microorganism; and
(b) injecting the optimal nutrient formulation into the subsurface through the at least one injection well.

12. The method according to claim 10, further comprising injecting at least one gas-producing microorganism into the subsurface through the at least one injection well.

13. The method according to claim 12, further comprising conducting testing to determine an optimal bioaugmentation formulation that includes the at least one gas-producing microorganism to produce gas in the subsurface.

14. The method according to claim 13, wherein the optimal bioaugmentation formation further includes at least one of: at least one nutrient; at least one gas-producing microorganism isolated and cultured from a test sample; or at least one gas-producing microorganism known to produce gas under high temperature anoxic conditions.

15. The method according to claim 10, wherein the at least one dormant microorganism is one of: a thermophilic endospore forming bacteria; a mesophilic endospore forming bacteria; a non-spore forming bacteria; or an archaea.

16. The method according to claim 10, wherein utilizing a change in temperature causes cooling the subsurface or heating the subsurface.

17. A method for oil recovery in a subsurface of an oil reservoir, the method comprising the steps of:
(a) retrieving a test sample from a microbial seed bank located in the subsurface of the oil reservoir;
(b) conducting testing of the test sample to identify at least one in situ dormant microorganism;
(c) determining at least one of: an optimal nutrient formulation or an optimal bioaugmentation formulation to stimulate activity of the at least one in situ dormant microorganism from the microbial seed bank located in the subsurface to produce a gas pressure;
(d) injecting at least one of: the optimal nutrient formulation or the optimal bioaugmentation formulation into the subsurface through at least one injection well;
(e) utilizing the gas pressure in recovery of subsurface oil through a production recovery well or the at least one injection well; and
utilizing a change in temperature of the subsurface, wherein: after the change in temperature of the subsurface, the temperature of the subsurface is one of: between above an in situ temperature and below an upper limit for microbial life; or between below the in situ temperature and above a lower limit for microbial life; to stimulate activity of the at least one in situ dormant microorganism from a microbial seed bank located in the subsurface to produce the gas pressure.

18. The method according to claim 17, wherein the optimal bioaugmentation formation further includes at least one of: at least one nutrient; at least one gas-producing microorganism isolated and cultured from the microbial seed bank; or at least one gas-producing microorganism known to produce gas under high temperature anoxic conditions.

19. The method according to claim 17, wherein the optimal nutrient formulation includes at least one of: carbon-based organic compounds; nitrogen; sulfur; phosphorous; iron; manganese; metal compounds; vitamins; oxygen; nitrate; metal oxides; sulphates; molasses; municipal wastewater; freeze dried algae; biomass; yeast extract; tryptic soy broth; peptone; toluene; lactate; butyrate; propionate; or acetate.

* * * * *